United States Patent [19]

Igarashi et al.

[11] 4,332,517

[45] Jun. 1, 1982

[54] CONTROL DEVICE FOR AN EARTHWORK MACHINE

[75] Inventors: Michiaki Igarashi, Yokosuka; Tetsuya Nakayama, Fujisawa; Shigemi Yamano, Isehara, all of Japan

[73] Assignee: Kabushiki Kaisha Komatsu Seisakusho, Tokyo, Japan

[21] Appl. No.: 81,886

[22] Filed: Oct. 4, 1979

[30] Foreign Application Priority Data

Oct. 6, 1978 [JP] Japan ............................... 53-123775

[51] Int. Cl.$^3$ .............................................. E02F 3/32
[52] U.S. Cl. ............................... 414/699; 37/DIG. 1; 414/728; 364/424
[58] Field of Search ................ 364/424; 318/625, 637; 37/103, DIG. 1, DIG. 14, DIG. 19, DIG. 20; 414/694, 697, 699, 700, 706, 708, 714, 716, 728, 5; 244/17.13, 179

[56] References Cited

U.S. PATENT DOCUMENTS

| | | | |
|---|---|---|---|
| 3,386,689 | 6/1968 | Parker | 244/179 |
| 3,636,325 | 1/1972 | Chytil | 364/424 X |
| 3,656,640 | 4/1972 | Schwing | 414/694 |
| 3,997,071 | 12/1976 | Teach | 37/DIG. 19 X |
| 4,015,729 | 4/1977 | Parquet | 414/699 X |
| 4,059,196 | 11/1977 | Uchino | 414/699 |

FOREIGN PATENT DOCUMENTS

1396050  3/1965  France ................................. 37/103

*Primary Examiner*—Trygve M. Blix
*Assistant Examiner*—Terrance L. Siemens
*Attorney, Agent, or Firm*—Spensley, Horn, Jubas & Lubitz

[57] ABSTRACT

The control device for an earthwork machine according to the invention is designed for reducing the manufacturing cost of the earthwork machine by eliminating some of the calculating circuitry and the control circuitry. According to the control device, one of the cylinders necessary for carrying out straight excavation is directly manually controlled without using calculating circuitry, and the operations of the cylinders are respectively detected by detecting circuitry. The other two cylinders are also controlled by the arithmetic unit provided in the control device for performing calculation necessary to move the sharp edge of the bucket along a straight line of predetermined inclination in accordance with detected pivoted angles of the boom, arm and bucket.

8 Claims, 8 Drawing Figures

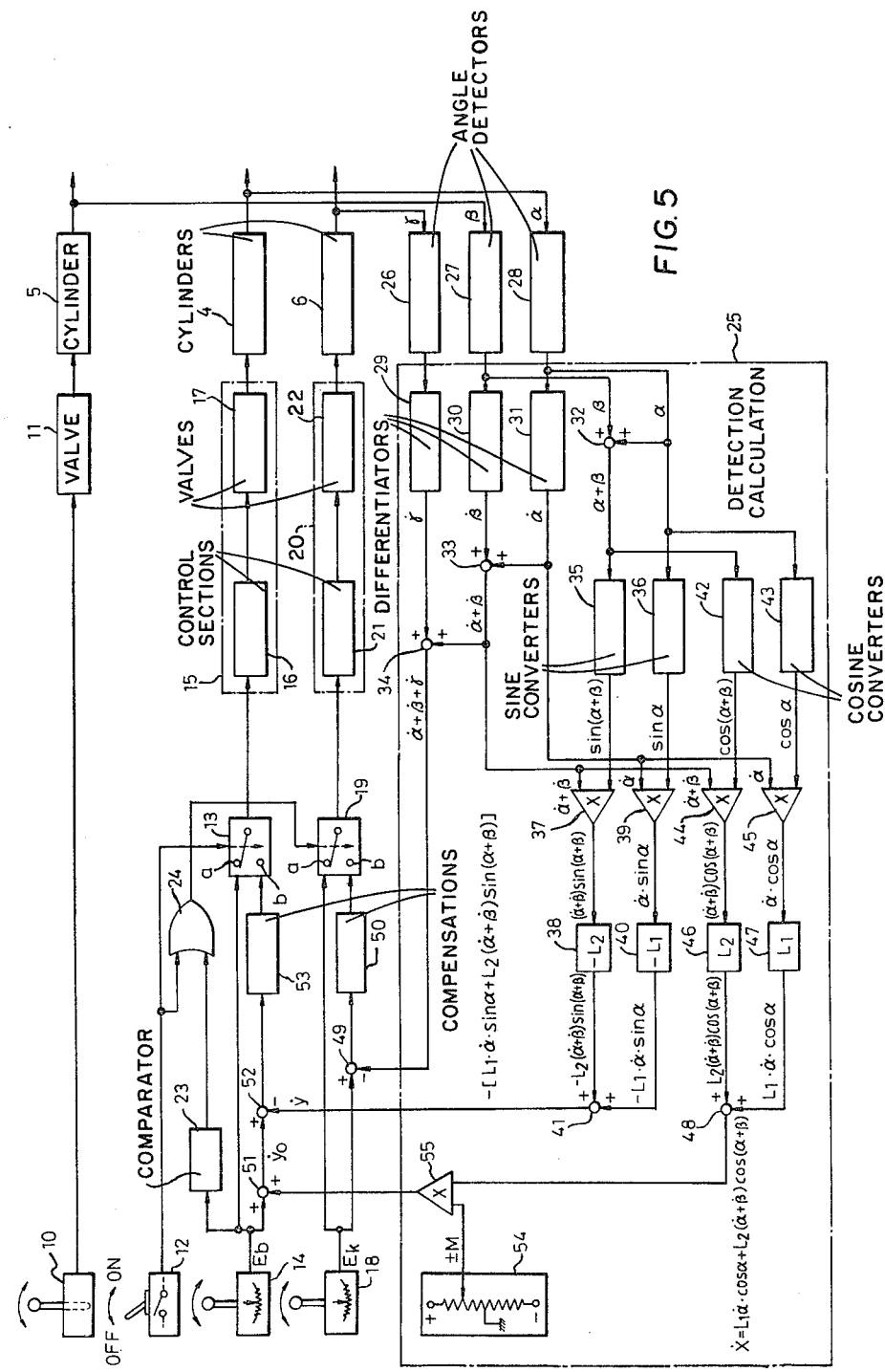

CONTROL DEVICE FOR AN EARTHWORK MACHINE

BACKGROUND OF THE INVENTION

This invention relates to an earthwork machine control device which permits an earth-work machine such as a power shovel to readily conduct straight excavation.

If the position of a hydraulic power shovel as shown in FIG. 1 is expressed by x-y coordinates as shown in FIG. 2, the position (x, y) of the top of the earthwork machine (the sharp edge D of the bucket 3) is as indicated by the following equations (1) and (2) as well known in the art:

$$x = L_1 \cdot \sin \alpha + L_2 \cdot \sin(\alpha+\beta) + L_3 \cdot \sin(\alpha+\beta+\gamma) \quad (1)$$

$$y = L_1 \cdot \cos \alpha + L_2 \cdot \cos(\alpha+\beta) + L_3 \cdot \cos(\alpha+\beta+\gamma) \quad (2)$$

where
original point O: the boom 1 pivoting fulcrum
point B: the arm 2 pivoting fulcrum
point C: the bucket 3 pivoting fulcrum
$L_1$: the length between the points O and B
$L_2$: the length between the points B and C
$L_3$: the length between the points C and D
$\alpha$: the angle between the y-axis and the segment OB
$\beta$: the angle between the segments OB and BC
$\gamma$: the angle between the segments BC and CD that is, the angle between an arm and a top opening plane of a bucket In this connection, the x-axis is the line of intersection of a plane including the points O, B, C and D and a plane including the boom fulcrum O and in parallel with the ground surface on which the vehicle is positioned; and the y-axis is a straight line passing through the boom fulcrum O and perpendicular to the ground surface. The angle $\alpha$ can be varied by telescoping the boom cylinder 4. Similarly, the angles $\beta$ and $\gamma$ can be varied by the arm cylinder 5 and the bucket cylinder 6, respectively.

On the other hand, for straight excavation (the excavation locus being straight) it is necessary to straightly move the sharp edge D, i.e. the position (x, y) of the sharp edge D must meet the following equation (3):

$$y = M \cdot x + N \quad (3)$$

where M and N are optional constants.

Heretofore, the following system is employed according to the above-described principle: First, conditions such as excavation surface inclination (corresponding to M in the equation (3)), excavation depth (corresponding to N in the equation (3)), bucket excavation angle (corresponding to $(\alpha+\beta+\gamma)$ in the equations (1) and (2)) and excavation speed are provided by means of an operating board or levers. According to a principle similar to that of the equations (1) through (3), the amounts of operation (corresponding to the angles $\alpha$, $\beta$ and $\gamma$ or the angular velocities $\alpha$, $\beta$ and $\gamma$) of the hydraulic cylinders 4, 5 and 6 necessary for straight excavation are calculated from these conditions and the angles $\alpha$, $\beta$ and $\gamma$ outputted by detectors. Then, according to the calculation results, the boom angle $\alpha$, arm angle $\beta$ and bucket angle $\gamma$ are controlled. This calculation can be achieved according to various systems.

However, the system in which the amounts of operation of the cylinders 4, 5 and 6 are calculated from the conditions provided by the control board or the like and the resultant values are employed as input signals to control the operations of the relevant parts, is disadvantageous in the following points: It is necessary to provide a calculation unit or units for calculating the amounts of operation of the cylinders 4, 5 and 6 and control units for controling the operations of the cylinder 4, 5 and 6 according to the calculation results thereof. Accordingly, the system itself is expensive. In addition, if any one of the control units provides control error by being affected by external disturbance or the like, then the excavation locus will not be straight.

Hydraulic circuits for driving the hydraulic cylinders 4, 5 and 6 are, in general, provided with relief valves for security. If any one of the hydraulic cylinders is overloaded by the presence of an obstruction during the excavation, then its relief valve is opened so as to stop the hydraulic cylinder. In this case, the remaining hydraulic cylinders are operated as calculated, and therefore it becomes impossible to perform the aimed straight excavation.

SUMMARY OF THE INVENTION

In view of the foregoing, an object of this invention is to provide an earthwork machine control device in which the manufacturing cost is reduced by eliminating some of the calculating means and the control means, and the above-described problems attributable to the relief valves are solved.

According to the invention, one of the cylinders necessary for carrying out straight excavation is directly manually controlled without using calculating means, and the operation of the cylinder thus controlled is detected by detecting means. According to the detection results, the amounts of operation of the remaining cylinders are calculated so that the locus of excavation is straight, and the calculation results are used to control the operations of the remaining cylinders.

That is, as one cylinder is manually operated, its calculating means and control means can be eliminated or simplified. The remaining cylinders are subordinately controlled according to the control results of the manually operated cylinder. Accordingly, when the relief valve is opened to stop the manually operated cylinder, the control of the remaining cylinders is also stopped, thus eliminating the above-described difficulty accompanying a conventional earthwork machine.

BRIEF DESCRIPTION OF THE DRAWINGS

In the accompanying drawings:

FIG. 5 is a block diagram showing one example of an earthwork machine control device according to this invention.

DETAILED DESCRIPTION OF THE INVENTION

As described above, in this invention, one of the cylinders is manually operated. Therefore, it is necessary to determine the cylinder which is manually operated. This will be first described.

The problem attributable to the operation of the relief valves can be solved by a method in which the cylinder which is most often overloaded during the excavation is manually controlled so that the amounts of operation of the remaining cylinders are determined. In this method, even if the speed of the former (hereinafter referred to as "a reference cylinder" when applicable) is varied by the relief operation, the amounts of operation of the remaining cylinders are changed according to the variation of speed of the fomer.

Figure 1:
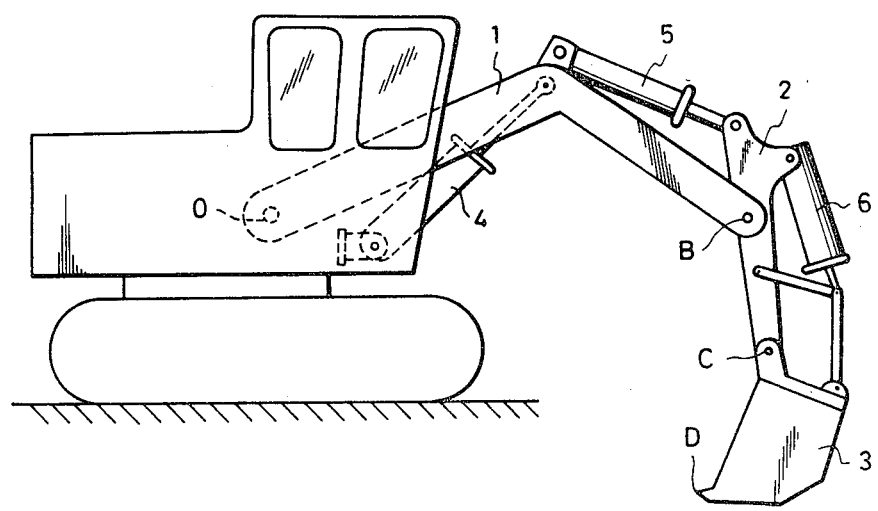
FIG. 1 is a side view showing the arrangement of a hydraulic power shovel.
Figure 2:
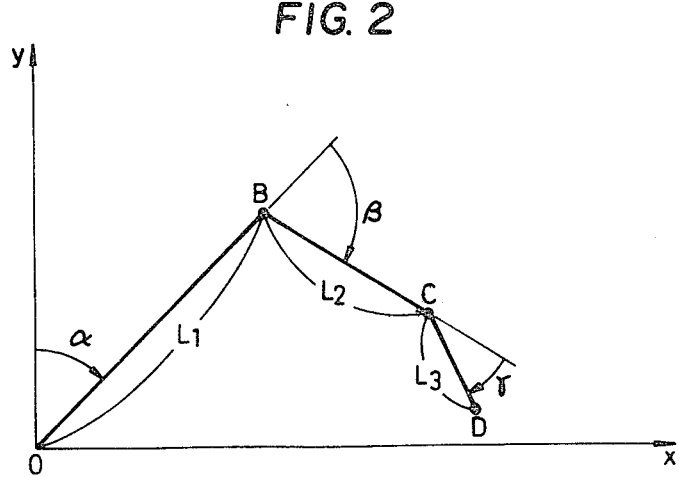
FIG. 2 is an explanatory diagram for defining the coordinate positions and angles of various parts of the power shovel shown in FIG. 1.
Figure 3A:
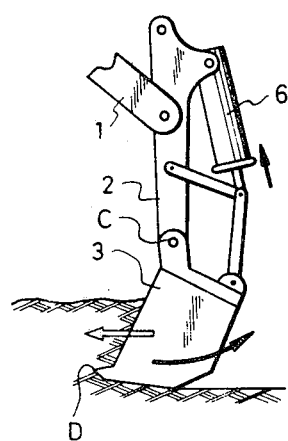
FIG. 3(a) is a diagram showing the load which exerts on the bucket cylinder of the power shovel during the excavation.
Figure 3B:
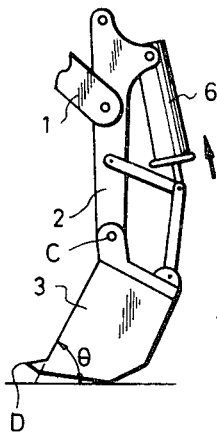
FIGS. 3(b) and 3(c) show the direction in which the bucket cylinder is controlled during the excavation.
Figure 3C:
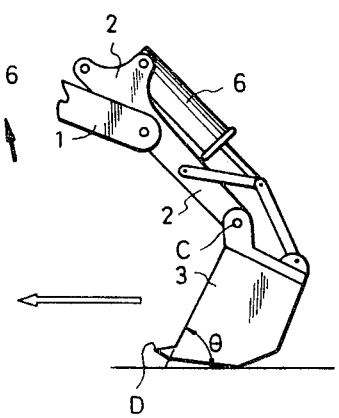

In the bucket cylinder 6, excavation reaction occurs to retract the cylinder 6 at its rod at all times during the excavation as indicated in FIG. 3(a). On the other hand, in order to perform the excavation with the excavation angle $(\alpha+\beta+\gamma)$ of the bucket 3 maintained unchanged, is it suitable to gradually retract the bucket cylinder 6 as shown in FIGS. 3(b) and 3(c). Thus, the contraction of the cylinder 6 is accelerated by the excavation reaction, and accordingly no relief operation is caused. Therefore, it is not suitable to employ the bucket cylinder 6 as the reference cylinder.

Thus, it is necessary to employ either the boom cylinder 4 or the arm cylinder 5 as the reference cylinder. In this embodiment, the arm cylinder 5 is employed as the reference cylinder due to the following reasons: In general, the excavation is carried out mainly by the operation of the arm. In straight excavation work, as is apparent from the parts FIGS. 4(a) and 4(b) 4, the boom angle $\alpha$ can be maintained unchanged with respect to various arm angles $\beta$; that is, a plurality of arm angles $\beta$ can be provided for a certain boom angle $\alpha$.

Figure 4A:
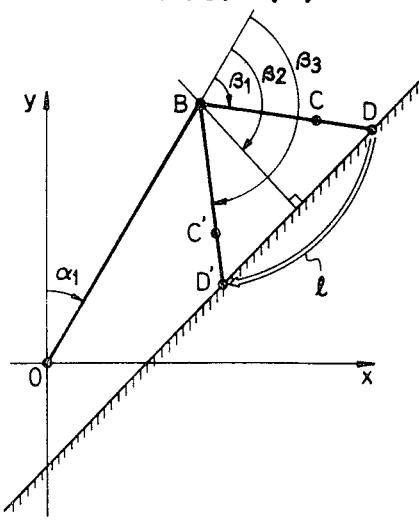
FIG. 4(a) is a diagram for a description of the fact that a plurality of boom angles are available for one arm angle, and indicating the locus of the sharp point of the power shovel with the arm angle maintained unchanged.
Figure 4B:
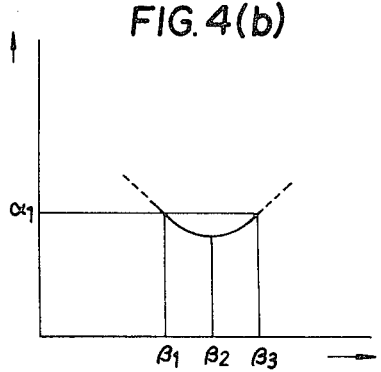
FIG. 4(b) is a graphical representation indicating the relation between the arm angle and the boom angle in the case of straight excavation.

If, under the conditions that the arm cylinder 5 is the reference cylinder and the boom angle $\alpha$ is held at $\alpha_1$, the arm angle $\beta$ is changed to $\beta_1$, $\beta_2$ and $\beta_3$ successively, then the locus of the sharp edge is arcuate as indicated by the heavy line l in the FIG. 4(a); that is, the straight excavation is not conducted in this case. It is assumed that the angle between the vertical line perpendicular to the excavation surface from the arm fulcrum B and the boom 1 is $\beta_2$. Then, it is necessary to gradually move the boom 1 upwardly ($\alpha$ being decreased) when the arm angle $\beta$ is being changed from $\beta_1$ to $\beta_2$, and it is necessary to gradually move the boom 1 downwardly when the arm angle $\beta$ is being changed from $\beta_2$ to $\beta_3$. This can be represented by a curve having a certain limit value as indicated in FIG. 4(b).

Now, one example of an earthwork machine control device according to the invention with the arm cylinder 5 as the reference cylinder will be described with reference to FIG. 5. The example is so designed that the manual operation (which is the operation of controlling the boom 1, the arm 2, and the bucket 3 individually) and the automatic operation (which is the straight excavation effected with the arm cylinder 5 as the reference cylinder) can be switched.

In FIG. 5, upon operation of an arm operating lever 10, hydraulic pressure corresponding to the angular position of the lever 10 is applied through a manual operating valve 11 to the arm cylinder 5 to control the latter as desired. If, in this case, an electrical signal is generated in correspondence to the amount of operation of the arm operating lever 10 and a flow rate control device such as a servo valve is used instead of the manual operating valve 11, then the arm cylinder can be electrically controlled.

The operations of the boom 1 and the bucket 3 effected during the manual operation (or in a manual mode) will be described.

To operate in the manual mode, the operator trips the armature of a manual-automatic change-over switch 12 is to the manual side (or the off angular position).

When the manual-automatic change-over switch 12 is in the manual position, the armature of a boom change-over switch 13 is tripped over to the contact a, so that a signal Eb corresponding to the position of a boom operating lever 14 is applied to a position control section 16 in a boom speed control section 15. The position control section 16 operates to control the position (or opening degree) of a manual operating valve 17 according to the signal Eb applied thereto. Thus, the boom cylinder 4 is controlled in accordance with the operation of the boom operating lever 14.

In the example shown in FIG. 5, the operating signal Eb is applied to the position control section 16 so that the latter 16 drives the manual operating valve 17. However, the control characteristic can be improved by employing a method in which a servo valve or the like is directly driven by the signal Eb so that the flow rate is controlled by the deviation occurred between the signal Eb and the servo valve.

In the manual mode, the armature of a bucket change-over switch 19 is tripped over to the contact a in response to the signal from the above-described manual-automatic change-over switch 12, as a result of which a signal Ek corresponding to the position of a bucket operating lever 18 is applied to a bucket speed control section 20. Similarly as in the case of the boom cylinder 4, the signal Ek is applied to a position control section 21 in the bucket speed control section 20 to open a manual operating valve 22, as a result of which the bucket cylinder 6 is controlled in accordance with the operation of the bucket operating lever 18. In this example, a comparator 23 having an internal reference is provided which detects in response to the signal Eb the fact that the boom operating lever 14 is operated, thereby to output a detection signal. In addition, a feedback loop is formed so that when the boom lever 14 is operated, in the manual operation also the bucket change-over switch 19 is turned on (the armature being tripped over to the contact b) by means of the comparator 23 and an OR circuit 24, thereby to maintain the bucket excavation angle $(\alpha+\beta+\gamma)$ unchanged. This will be described in more detail with respect to the automatic mode.

The operations of the boom 1 and the bucket 3 effected during the automatic operation (or in the automatic mode) will be described.

First, the principle of automatic mode control will be described.

In the automatic mode, straight excavation is conducted with the bucket excavation angle maintained unchanged.

In order to maintain the bucket excavation angle unchanged, the following equation (4) or (5) must be satisfied:

$$\alpha+\beta+\gamma=\text{constant} \quad (4)$$

$$\dot{\alpha}+\dot{\beta}+\dot{\gamma}=0 \quad (5)$$

In order to carry out the straight excavation, the equation (3) described above or the following equation (6) must be satisfied:

$$\dot{y}=M\cdot\dot{x} \quad (6)$$

where $\dot{y}=dy/dt$ and $\dot{x}=dx/dt$ (t designates the time) Then, the position (x, y) of the sharp edge of the bucket indicated by the equations (1) and (2) is subjected to differentiation with time:

$$\dot{x} = L_1 \cdot \dot{\alpha} \cdot \cos\alpha + L_2(\dot{\alpha} + \dot{\beta}) \cos(\alpha + \beta) + \quad (7)$$
$$L_3(\dot{\alpha} + \dot{\beta} + \dot{\gamma}) \cos(\alpha + \beta + \gamma)$$

$$\dot{y} = - [L_1 \cdot \dot{\alpha} \cdot \sin\alpha + L_2 \cdot (\dot{\alpha} + \dot{\beta}) \cdot \sin(\alpha + \beta) + \quad (8)$$
$$L_3 \cdot (\dot{\alpha} + \dot{\beta} + \dot{\gamma}) \sin(\alpha + \beta + \gamma)]$$

Accordingly, if it is assumed that the bucket excavation angle is controlled constant ($\dot{\alpha}+\dot{\beta}+\dot{\gamma}=0$), the third terms in the right sides of the equations (7) and (8) become zero (0). Therefore, the values $\dot{x}$ and $\dot{y}$ can be expressed by the following equations (9) and (10), respectively:

$$\dot{x}=L_1\cdot\alpha\cdot\cos\dot{\alpha}+L_2(\dot{\alpha}+\dot{\beta})\cdot\cos(\alpha+\beta) \quad (9)$$

$$\dot{y}=-[L_1\cdot\alpha\sin\dot{\alpha}+L_2(\dot{\alpha}+\dot{\beta})\sin(\alpha+\beta)] \quad (10)$$

Therefore, the straight excavation can be achieved by employing the following method: The angle $\alpha$, $\beta$ and $\gamma$ are detected, and the value $(\dot{\alpha}+\dot{\beta}+\dot{\gamma})$ and the values $\dot{x}$ and $\dot{y}$ are obtained from the detection values, whereby the bucket cylinder is controlled so that $\dot{\alpha}+\dot{\beta}+\dot{\gamma}=0$ is established, while the boom cylinder 4 is controlled so that $\dot{y}=M\cdot\dot{x}$ is established.

Thus, in the example shown in FIG. 5, a detection calculation section 25 is provided which obtains the bucket excavation angle $(\alpha+\beta+\gamma)$ and the values $\dot{x}$ and $\dot{y}$ of the equations (9) and (10) from detected angles $\alpha$, $\beta$ and $\gamma$.

In the detection calculation section 25, angle detectors 26, 27 and 28 are potentiometers provided for the bucket cylinder 6, the arm cylinder 5 and the boom cylinder 4 to detect angles $\alpha$, $\beta$ and $\gamma$, respectively. Differentiators 29, 30 and 31 subject the detected values of differentiation to obtain values corresponding to the values $\dot{\gamma}$, $\dot{\beta}$ and $\dot{\alpha}$, respectively. An addition point 33 subjects the values $\dot{\alpha}$ and $\dot{\beta}$ to addition to provide the value $(\dot{\alpha}+\dot{\beta})$. In another addition point 34, the value $(\dot{\alpha}+\dot{\beta})$ is added to the value $\dot{\gamma}$ to provide the value $(\dot{\alpha}+\dot{\beta}+\dot{\gamma})$. In another addition point 32, the detection values $\alpha$ and $\beta$ are subjected to addition to provide the value $(\alpha+\beta)$. In a sine converter 35, the value $(\alpha+\beta)$ is converted into a value $\sin(\alpha+\beta)$ which is applied to one input terminal of a multiplier 37, to the other input terminal of which the value $(\dot{\alpha}+\dot{\beta})$ is applied from the addition point 33. In the multiplier 37, these values are subjected to multiplication to provide a value $(\dot{\alpha}+\dot{\beta})\sin(\alpha+\beta)$. In a coefficient unit 38, the output of the multiplier 37 is prefixed with a coefficient $-L_2$; that is, a value $-L_2(\dot{\alpha}+\dot{\beta})\sin(\alpha+\beta)$ is outputted to an addition point 41.

A sine converter 36 converts the angle $\alpha$ detected by the angle detector 28 into a value $\sin\alpha$ which is applied to one input terminal of a multiplier 39, to the other input terminal of which the value $\dot{\alpha}$ is applied from the differentiator 31. In the multiplier 39, the two inputs are subjected to multiplication to provide a value $\dot{\alpha}\sin\alpha$. In a coefficient unit 40, this value is prefixed with a coefficient $-L_1$; that is, a value $-L_1\cdot\dot{\alpha}\sin\alpha$ is outputted to the addition point 41. In the addition point 41, the two inputs are subjected to addition, as a result of which a value $-[L_1\cdot\dot{\alpha}\sin\alpha + L_2(\dot{\alpha}+\dot{\beta})\sin(\alpha+\beta)]$, i.e. a value $\dot{y}$ is provided.

In a cosine converter 42, the output value $(\alpha+\beta)$ of the addition point 32 is converted into a value $\cos(\alpha+\beta)$ which is applied to a multiplier 44. In the multiplier 44, this value and the value $(\dot{\alpha}+\dot{\beta})$ from the addition point 33 are subjected to multiplication, so that a value $(\dot{\alpha}+\dot{\beta}) \times \cos(\alpha+\beta)$ is outputted. This value is prefixed with a coefficient $L_2$ in a coefficient unit 46, and the resultant value is applied to an addition point 48. In a cosine converter 43, the value $\alpha$ from the angle detector 28 is converted into a value $\cos\alpha$. This value is multiplied by the output $\dot{\alpha}$ of the above-described differentiator 31 in a multiplier 45, so that a value $\dot{\alpha}\cos\dot{\alpha}$ is outputted. This value is prefixed with a coefficient $L_1$ in a coefficient unit 47, and the resultant value is applied to the addition point 48. In the addition point 48, the two input values are subjected to addition, to provide a value $L_1\dot{\alpha}\cos\alpha + L_2(\dot{\alpha}+\dot{\beta})\cos(\alpha+\beta)$, i.e. a value $\dot{x}$.

Thus, the values $(\dot{\alpha}+\dot{\beta}+\dot{\gamma})$, $\dot{x}$ and $\dot{y}$ have been obtained from the detected angles $\alpha$, $\beta$ and $\gamma$.

Next, the operation in the automatic mode will be described.

In the automatic mode, the armature of the above-described manual-automatic change-over switch 12 is tripped over the automatic side (or the on side) and the armature of the bucket change-over switch 19 is tripped over the contact b. The difference value between the bucket operating signal Ek obtained at the addition point 49 and the bucket excavation angle $(\dot{\alpha}+\dot{\beta}+\dot{\gamma})$ obtained at the detection calculation section 25 is applied through a compensation element 50 to the contact b of the bucket change-over switch 19. The bucket cylinder 6 is driven by the bucket speed control section 20 so that the difference value becomes zero (0). If Ek=0 is established without operating the bucket operating lever 18, then automatic control is effected so that $Ek=\alpha+\beta+\gamma=0$ is established. Therefore, the bucket excavation angle $(\alpha+\beta+\gamma)$ is maintained unchanged. If it is required to change the bucket excavation angle for some reason, the bucket excavation angle can be changed as required by suitably operating the bucket operating lever.

The compensation element is to improve the stability, accuracy and response to the feedback control system. A typical known example of the compensation element is a PID controller.

As described before, in the manual mode also, the operation of the boom lever 14 causes the signal from the comparator 23 to be applied through the OR circuit 24 to the bucket change-over switch 19, as a result of which the armature of the switch 19 is tipped over to the contact b. Thus, similarly in the above-described operation, the bucket cylinder 6 is so controlled that the bucket excavation angle $(\alpha+\beta+\gamma)$ is maintained unchanged.

The operation of the control section of the boom cylinder 4 in the automatic mode will be described. In the automatic mode, the armature of the boom change-over switch 13 is tripped over to the contact b.

For simplification in description, a signal from an excavation gradient setting section 54 is zero (0). In this case the output of a multiplier 55 is also zero (0). Therefore, the operating signal Eb from the boom lever 14 is applied as the target value of the value $\dot{y}$ (hereinafter referred to as "the target value $\dot{y}_0$" when applicable) to an addition point 52, as it is. The addition point 52 obtains the difference value between the signal Eb from the boom lever 14, i.e. the target value $y_0$ and the value $-[L_1 \cdot \alpha \sin \alpha + L_2(\dot{\alpha}+\dot{\beta}) \sin (\alpha+\beta)]$ from the detection calculation section 25, i.e. the detection value $\dot{y}$. This difference value thus obtained is applied through a compensation element 53 and the boom change-over switch 13 to the boom speed control section 15. Thus, the boom cylinder 4 is automatically so controlled that the target value $\dot{y}_0$ coincides with the detection value $\dot{y}$. Accordingly, if Eb=0 is established without operating the boom lever 14, then control is made so that Eb=y is established, and "y=constant" is obtained; that is, the horizontal excavation is effected. If it is required to move the sharp point up or down for some reason, the height of the sharp point can be changed as desired by suitably operating the boom lever 14.

The operation of the control section effected when a signal is provided by the excavation gradient setting section 54, will be described. The excavation gradient setting section 54 operates to set an excavation gradient with respect to the ground surface on which the vehicle is positioned, and to output a numerical value $\pm$ M corresponding to a gradient thus set (the signs + and − of the value $\pm$ M designate upward gradient and downward gradient, respectively; and M, the value of gradient). In a multiplier 55, the detection value $\dot{x}$ from the addition point 48 is multiplied by the set gradient from the excavation gradient setting section 54 to provide a value $\pm M \cdot \dot{x}$. In an addition point 51, the signal $\pm M \cdot \dot{x}$ from the multiplier 55 and the operating signal Eb from the boom lever are subjected to addition so that a value Eb$\pm M \cdot \dot{x}$ is outputted as the target value $\dot{y}_0$. Accordingly, the boom cylinder 4 is so controlled that the detection value $\dot{y}$ coincides with the value Eb+$M \cdot \dot{x}$. With Eb=0 without operating the boom lever 14, the target value $\dot{y}_0$ becomes $\pm M \cdot \dot{x}$, and the boom cylinder 4 is so controlled that the straight excavation is carried out with the gradient $\pm M$. Similarly as in the above-described case, in this case also, the height can be changed as desired by suitably operating the boom lever 14.

In the above-described example, the target value $\dot{y}_0$ (=$\pm M \cdot \dot{x}$) is obtained according to the detection value $\dot{x}$, and control is made so that the detection value $\dot{y}$ coincides with the target value $\dot{y}_0$. However, control may be made so that the detection value $\dot{x}$ coincides with the target value $\dot{x}_0$ $$\dot{x}_0 \left( = \pm \frac{1}{M} \dot{y} \right)$$

which is obtained according to the detection value y.

Furthermore, in the above-described example, the arm cylinder is employed as the reference cylinder; however, the boom cylinder may be employed as the reference cylinder. However, in this case a plurality of arm angles can be provided for a certain boom angle as was described before, and therefore it is necessary to contrive a means of solving this problem.

As is apparent from the above description, in this invention, one of the cylinders required for straight excavation is directly manually controlled without using a calculation means or the like, and according to the results of the control the remaining cylinders are controlled to carry out the straight excavation. Accordingly, even when the relief valve provided for the cylinder which is manually controlled is opened, the locus of excavation is always straight. In addition, as some calculation means can be eliminated, the construction of control device can be simplified as much.

What is claimed is:

1. A control device for use in an earthwork machine of the type having a boom pivotally secured at one end thereof to one point of a machine body, an arm pivotally secured at one end thereof to the other end of the boom, and a bucket rotatably secured at the upper end thereof to the other end of the arm, a boom cylinder for varying an angle $\alpha$ between the vertical axis from the one end of the boom and the boom, an arm cylinder for varying an angle $\beta$ between the boom and the arm, and a bucket cylinder for varying an angle $\alpha$ between the arm and a top opening plane of the bucket, comprising:

first control means for manually controlling one of the boom, arm and bucket, a plurality of angle detectors for respectively detecting the pivoted or rotated angle of the boom, arm and bucket, an arithmetic unit for performing calculations necessary to move the sharp edge of the bucket along a straight line of predetermined inclination in accordance with detected pivoted or rotated angles of the boom, arm and bucket to thereby produce data representing amounts to be moved of other than the manually operated one of the boom, arm and bucket, and second control means for controlling other than the manually operated one of the boom, arm and bucket in accordance with the calculated output from said arithmetic unit.

2. The control device for an earthwork machine according to claim 1, wherein:

(a) said arithmetic unit comprises:

means for obtaining the pivoting or rotating speeds of the detected boom, arm and bucket from the pivoted or rotated angles of the boom, arm and bucket, means for calculating the x-axial moving speed $\dot{x}$ and the y-axial moving speed $\dot{y}$ of the sharp edge of the bucket according to the detected pivoted or rotated angles and pivoting or rotating speeds of the boom, arm and bucket in coordinates of a plane including the boom, arm and bucket, and gradient setting means for obtaining a target moving speed $\dot{y}$ of the sharp edge of the bucket in the y-axial direction (or a target moving speed $\dot{x}_0$ in the x-axial direction) necessary to move the sharp edge of the bucket along the straight line of predetermined inclination on the basis of the calculated moving speed x (or y), and (b) wherein said second control means comprises means for controlling the boom or arm angle to coincide the detected moving speed $\dot{y}$ (or $\dot{x}$) with the target moving speed $\dot{y}_O$ (or $\dot{x}_O$), and means for controlling the movement of the bucket to maintain the angle of the sharp edge of the bucket unchanged on the basis of the detected rotating speed.

3. The control device according to claim 1, wherein, if the angle between the perpendicular line to the excavation surface from the fulcrum of said arm and the boom is represented by $\beta_2$, the boom is gradually upwardly moved as the arm angle is increased from a smaller angle than $\beta_2$ toward $\beta_2$, and the boom is gradually downwardly moved as the arm angle is increased from $\beta_2$ to a larger angle to thereby conduct the straight excavation by the bucket.

4. The control device according to claim 1, further comprising levers for respectively manually controlling the two of the boom, arm and bucket other than the manually operated one, manual-automatic change-over switch means, and change-over switch means operated by the output from said manual-automatic change-over means so as to control the respective boom, arm and bucket cylinders in accordance with the outputs of said respective levers in the manual mode and in accordance with the deviation between the output of said arithmetic unit and the output of the levers in the automatic mode.

5. The control device according to claim 1, wherein said arithmetic unit comprises in automatic operation a detection calculation section for obtaining a bucket excavation angle of the sum of $\alpha+\beta+\gamma$, an x-axial speed $\dot{x}$ and a y-axial speed $\dot{y}$ of the sharp edge of the bucket from the detected angles $\alpha$, $\beta$ and $\gamma$, said section including (a) differentiators for producing values corresponding to the angular speeds $\dot{\alpha}, \dot{\beta}$ and $\dot{\gamma}$ for boom cylinder, arm cylinder and bucket cylinder, (b) a first addition point for adding the values $\dot{\alpha}$ and $\dot{\beta}$ to provide a value $\dot{\alpha}+\dot{\beta}$, (c) a second addition point for adding the values $(\dot{\alpha}+\dot{\beta})$ and $\dot{\gamma}$ to provide a value $(\dot{\alpha}+\dot{\beta}+\dot{\gamma})$, (d) a third addition point for adding the detected angles $\alpha$ and $\beta$ from said angular detectors to provide a value $(\alpha+\beta)$, (e) a first sine converter for converting the value $(\alpha+\beta)$ into a value $\sin(\alpha+\beta)$, (f) a first multiplier receiving the value $\sin(\dot{\alpha}+\dot{\beta})$ at one input terminal and the value $(\dot{\alpha}+\dot{\beta})$ at the other input terminal from said third and first addition points for multiplying the former by the latter to provide a value $(\dot{\alpha}+\dot{\beta})\sin(\alpha+\beta)$, (g) a first coefficient unit receiving the output from said first multiplier for prefixing it with a coefficient $-L_2$ to provide $-L_2(\dot{\alpha}+\dot{\beta})\sin(\alpha+\beta)$, (h) a second sine converter for converting the detected angle $\alpha$ into a value $\sin \alpha$, (i) a second multiplier receiving the value $\sin \alpha$ at one input terminal and the value $\dot{\alpha}$ at the other input terminal for multiplying the former by the latter to provide a value $\dot{\alpha}\sin \alpha$, (j) a second coefficient unit for prefixing with a coefficient $-L_1$ to the output from the second multiplier to provide a value $-L_1\dot{\alpha}\sin \alpha$, (k) a fourth addition point receiving the value $-L_2(\dot{\alpha}+\dot{\beta})\sin(\alpha+\beta)$ from said coefficient unit and the value $-L_1\dot{\alpha}\sin \alpha$ from said second coefficient for adding both to provide $-[L_1\dot{\alpha}\sin \alpha+L_2(\dot{\alpha}+\dot{\beta})\sin(\alpha+\beta)]$ and accordingly $\dot{y}$, (1) a first cosine converter for converting the value $(\alpha+\beta)$ from said third addition point into a value $\cos(\alpha+\beta)$, (m) a third multiplier receiving the $\cos(\alpha+\beta)$ from the first cosine converter at one input terminal and the value $(\dot{\alpha}+\dot{\beta})$, from the first addition point at the other input terminal for multiplying the former by the latter to provide a value $(\dot{\alpha}+\dot{\beta})\cos(\alpha+\beta)$, (n) a third coefficient unit for prefixing with a coefficient $L_2$ to the output from the third multiplexer to provide a value $L_2(\dot{\alpha}+\dot{\beta})\cos(\alpha+\beta)$, (o) a second cosine converter for converting the value $\alpha$ from said angle detector into a value $\cos \alpha$, (p) a fourth multiplier receiving the value $\cos \alpha$ from the second cosine converter at one input terminal and the output $\dot{\alpha}$ of said differentiator at the other input terminal for multiplying the former by the latter to provide a value $\dot{\alpha}\cos \alpha$, (q) a fourth coefficient unit for prefixing it with a coefficient $L_1$ to the output of the fourth multiplier to provide a value $L_1\dot{\alpha}\cos \alpha$, (r) a fifth addition point receiving the value $L_2(\dot{\alpha}+\dot{\beta})\cos(\alpha+\beta)$ from said third coefficient unit and the value $L_1\dot{\alpha}\cos \alpha$ obtained through the fourth coefficient unit from the second cosine converter for adding both to provide $L_1\dot{\alpha}\cos \alpha+L_2(\dot{\alpha}+\dot{\beta})\cos(\alpha+\beta)$ and accordingly $\dot{x}$.

6. A control device for an earthwork machine having a boom pivotally secured at a first end thereof to one point of a machine body, an arm pivotally secured at one end thereof to the other end of the boom, and a bucket rotatably secured at the upper end thereof to the other end of the arm, a boom cylinder for varying an angle $\alpha$ between the vertical axis from the first end of the boom and the boom, an arm cylinder for varying an angle $\beta$ between the boom and the arm, a bucket cylinder for varying an angle $\gamma$ between the arm and the bucket, first setting means for providing a set value corresponding to the desired motion of a predetermined one of the boom, arm and bucket, second setting means for providing a set value corresponding to the desired pivotal or rotatable position of another one of the boom, arm and bucket, third setting means for providing a set value corresponding to the desired pivotal or rotatable position of the other thereof, and controllers for respectively controlling the movements of the boom, arm and bucket in accordance with the set values of said first, second and third setting means, comprising:

angle detectors for detecting the pivoted or rotated angles of the boom, arm and bucket, respectively, an arithmetic unit for producing control data necessary to move the sharp edge of the bucket along a straight path of a predetermined gradient on the basis of the detected angles of the boom, arm and bucket when said first setting means is manually operated, and switch means located between said second and third setting means and the corresponding controllers for selectively applying to the respective controllers either the control data indicating calculated movement amount of the boom, arm and bucket or signals from the second and third setting means.

7. The control device according to claim 6, wherein:
(a) said arithmetic unit comprises:
means for obtaining the pivoting or rotating speeds of the boom, arm and bucket on the basis of the detected pivoted or rotated angles of the respective boom, arm and bucket,
means for calculating the x-axial moving speed $\dot{x}$ and the y-axial moving speed $\dot{y}$ of the sharp edge of the bucket from the detected pivoted or rotated angles and pivoting or rotating speeds in coordinates of a plane including the boom, arm and bucket, and
gradient setting means for obtaining a target moving speed $\dot{y}_0$ of the sharp edge of the bucket in the y-axial direction (or the target moving speed $\dot{x}_0$) necessary to move the sharp edge of the bucket along the straight path of predetermined gradient on the basis of the obtained moving speed ($\dot{x}$ or $\dot{y}$), (b) the controller corresponding to said second setting means is means for controlling the movement of the boom corresponding to coincidence of the detected moving speed ($\dot{y}$ or $\dot{x}$) with the target moving speed ($\dot{y}_0$ or $\dot{x}_0$), and (c) the controller corresponding to said third setting means is means for controlling the moving of the bucket to maintain the angle of the sharp edge of the bucket unchanged on the basis of the detected pirovted or rotated angles of the boom, arm and bucket.

8. A control device for use in earthworking equipment of the type having a body, a boom which is pivotally secured to the body, an arm which is pivotally secured to the boom, a bucket pivotally secured to the arm, boom means for pivoting the boom with respect to the body, arm means for pivoting the arm with respect to the boom and bucket means for pivoting the bucket with respect to the arm, said control device comprising:

first control means for manually controlling one of the boom means, arm means and bucket means;

detection means for detecting the pivotal positions of the boom, arm and bucket;

arithmetic circuitry for determining, in response to the detected pivotal positions, the amount of movements of the two of the boom means, arm means and bucket means other than the manually controlled one necessary to move the edge of the bucket along a straight path; and second control means for automatically controlling the two of the boom means, arm means and bucket means other than the manually controlled one in accordance with the output of the arithmetic circuitry.

* * * * *